(12) United States Patent
Kotzalas et al.

(10) Patent No.: US 6,682,226 B2
(45) Date of Patent: Jan. 27, 2004

(54) CYLINDRICAL ROLLER BEARING WITH PRELOAD CAPABILITY

(75) Inventors: Michael N. Kotzalas, Canton, OH (US); Roger D. Knudsen, North Canton, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 10/142,294

(22) Filed: May 9, 2002

(65) Prior Publication Data
US 2003/0210843 A1 Nov. 13, 2003

(51) Int. Cl.[7] .............................................. F16C 33/58
(52) U.S. Cl. ....................................................... 384/563
(58) Field of Search .................................. 384/563, 565, 384/569, 517, 571

(56) References Cited

U.S. PATENT DOCUMENTS

| 958,143 | A | 5/1910 | Lockwood |
|---|---|---|---|
| 2,324,676 | A | 7/1943 | Butterfield |
| 3,651,550 | A | 3/1972 | Bennett |
| 3,801,171 | A | 4/1974 | Rozentals |
| 3,907,387 | A | 9/1975 | Spieth |
| 3,930,693 | A | 1/1976 | Bowen |
| 4,457,568 | A | 7/1984 | Crawford et al. |
| 4,707,151 | A | 11/1987 | Kaiser |
| 5,961,221 | A | 10/1999 | Kamimura |

FOREIGN PATENT DOCUMENTS

| EP | 0426279 | 5/1997 |
|---|---|---|
| JP | 6298025 | 5/1987 |
| JP | 724603 | 1/1995 |
| JP | 8174306 | 7/1996 |
| JP | 8177852 | 7/1996 |
| JP | 193744 | 7/2001 |

*Primary Examiner*—Lenard A Footland
(74) *Attorney, Agent, or Firm*—Polster, Lieder, Woodruff & Lucchesi, L.C.

(57) ABSTRACT

A cylindrical roller bearing having preloading capability is disclosed. A preloading mechanism having an annular groove having a deformable raceway and which is configured to accept a segmented support ring is incorporated into either the outer race of the inner race. A plurality of fasteners are installed in holes in the flanges of the annular groove and into the segmented support ring. By tightening the fasteners, the flanges of the annular groove are tightened against the segmented support ring, thereby deforming the deformable raceway from an arcuate shape to a flat or slightly crowned shape, placing a preload on the rollers of the bearing. The amount of preload is determined by the angular and dimensional interface between the segmented support ring and the annular groove.

20 Claims, 2 Drawing Sheets

All angles and radii in all figures are exaggerated for clarity.

All angles and radii in all figures are exaggerated for clarity.

CYLINDRICAL ROLLER BEARING WITH PRELOAD CAPABILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates in general to a cylindrical roller bearing and, more particularly, to a cylindrical roller bearing having preloading capability.

2. Description of Related Art

Cylindrical roller bearings typically have radial clearance within the bearings themselves. The radial clearance allows for the bearing components to be easily assembled without interference. There are a few cylindrical roller bearing configurations, however, that operate with zero or negative clearance, that is, in a preloaded condition. This is typically achieved by driving the inner race onto a tapered shaft, or using specially designed bearings which are intentionally out-of-round, otherwise known as 2 or 3 point lobing. An example of such out of round bearings are those used generally in aerospace applications such as jet engines.

Bearings having positive clearance can have degraded performance under some operating conditions. The clearance allows a roller to move independently of the bearing races and other rollers. When the roller is outside the loaded zone of the bearing, this movement can lead to skidding and scuffing damage on the contact surfaces of the raceways and roller, as well as damage or breakage of a roller cage. Also, bearings having positive clearance cannot be optimized for roller load sharing and fatigue life because the optimal fatigue performance is obtained when the bearing is mounted with zero or negative clearance, that is, in a preload condition.

Bearings which have been driven onto a tapered shaft can also have other problems. Tensile hoop stresses are developed by driving the bearing onto the tapered seat, which can degrade the fatigue performance of the bearing. Also, the bearing bore diameter is usually sized and matched to the shaft to ensure the correct drive-up results can be obtained. This is costly and time consuming for the bearing manufacturer and the end user. These types of bearings are normally used in printing presses and in steel rolling mills.

The intentionally out-of-round condition that is used to preload a cylindrical roller bearing is also difficult to manufacture precisely. The stack up of the bearing outside diameter, outer raceway, rollers, inner raceway, bore and seat(s) must all be considered when designing this type of bearing system. The lobes are designed to eliminate the clearance needed at assembly when the bearing is pressed into position. After such installation, the bearing is preloaded at two or three azimuth locations, and this is used to prevent the roller elements from sliding. In addition to the tight tolerances required to manufacture such out-of-round bearings, the loads placed on the bearings must be small to ensure that the overall bearing radial deflection is smaller than the preload created by the lobes, or else the positive effects of preloading are lost. Finally, this method of obtaining a preload does not optimize the bearing fatigue performance because the load sharing is not uniform in this condition. Instead, two or three points carry higher loads than the rest of the raceway-roller contacts, which are not operating in a preload condition, but are operating in a clearance condition.

The present invention overcomes these and other problems by providing a cylindrical roller bearing which is capable of preloading the internal components of the bearing without the detrimental side effects of accelerated wear and fatigue found in other types of more costly preloaded cylindrical bearings.

SUMMARY OF THE INVENTION

The present invention resides in a cylindrical roller bearing having the ability to preload the bearing's internal components through the use of a preloading mechanism. The preloading mechanism includes an annular groove configured within either the inner or outer race, and into which a two piece support ring is installed. The flanges of the annular groove are bolted together with fasteners which go through the flanges and the support ring, resulting in the preloading of the raceway radially to preload the internal components of the bearing.

By applying a preload between the bearing raceways and the roller s, the rollers will be continuously loaded, thereby eliminating the possibility of gross sliding of the rollers, and reducing the skidding and scuffing problems that can cause premature damage of the rollers or bearing raceways. Such preloaded cylindrical roller bearings are useful in applications such as printing presses, rolling mills, and aerospace jet engines, or wherever a preloaded cylindrical bearing would be beneficial. Additionally, the present cylindrical roller bearing system can also be used in high speed, lightly loaded applications to reduce the risk of the previously mentioned skidding and scuffing damage. The present cylindrical roller bearing system can also be used, with minimal risk of cage damage, where large accelerations and/or decelerations of the bearing roller complement are expected.

In a bearing which has positive clearance, and is thus not preloaded, large accelerations can cause the rollers to exert impact forces on the pin or bridge of the rollers cage, possibly leading to cage damage and other bearing component damage. In contrast, the preloaded bearing in the present invention reduces the possibility of roller sliding, thus reducing the impact loads and the resulting cage damage. Additionally, the present invention does not introduce tensile hoop stresses to the bearing inner race, and delivers a uniform radial raceway deformation to induce preloading.

Finally the proposed method of preloading the cylindrical roller bearing allows for application and assembly specific angles and profiles to be ground on the faces and seats of the support ring. This angle defines the amount of bowing the raceway has, which directly correlates to the amount of preload.

Other objects and features of the present invention will be in part apparent and in part pointed out hereinafter.

Figure 1:
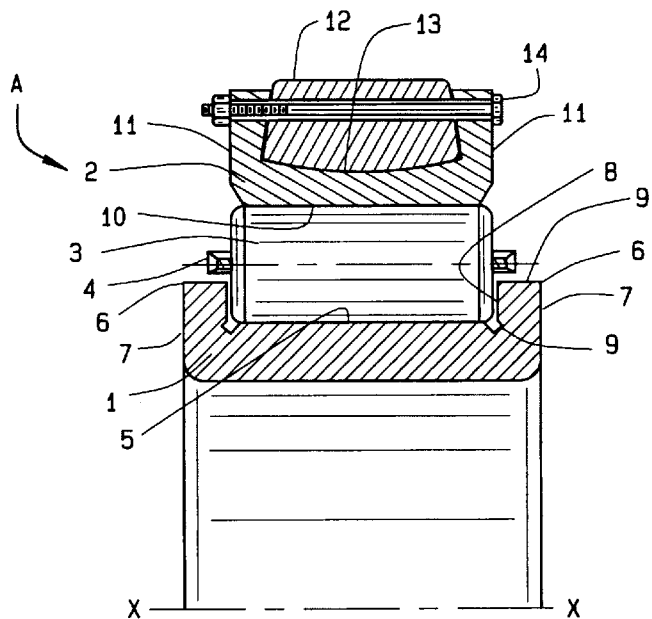
FIG. 1 is a sectional view of the cylindrical roller bearing of the present invention.

Please note that the angles and radii shown in FIG. 1, FIG. 3, FIG. 4, FIG. 5 and FIG. 6 are not to scale and have been greatly exaggerated to better show the geometric relationship between the components of the cylindrical roller bearing of the present invention. The actual dimensions and dimensional relationships between the bearing components are as described elsewhere herein.

Corresponding reference characters indicate corresponding parts throughout the several views of the drawings.

DETAILED DESCRIPTION OF THE INVENTION

The present invention discloses a cylindrical roller bearing having a preload mechanism for preloading the internal components of the bearing. While either the inner race or the outer race may be configured to incorporate the preloading mechanism of the present invention, the first embodiment described herein incorporates the preloading mechanism into the outer race of the bearing.

Referring now to the drawings, FIG. 1 depicts a first embodiment of preloadable cylindrical roller bearing A. The cylindrical roller bearing A is configured to fit between two machine components, such as a shaft and a housing, to enable one of the components to rotate relative to the other with minimal friction. The cylindrical bearing A includes an inner race 1 in the form of an annular channel and having an axis X, an outer race 2 also in the form of an annular channel which shares the axis X with the inner race 1 and which surrounds the inner race 1, and rollers 3 in the form of cylindrical rollers located between the inner race 1 and the outer race 2 to enable the inner race 1 to rotate relative to the outer race 2, or vice versa, with little torque. In addition, the bearing A may have a cage 4 which is likewise located between the inner race 1 and the outer race 2. The cage 4 maintains the proper spacing between the rollers 3.

The inner race 1, which is configured to fit around a shaft or similar machine component, has an inner raceway 5 that is cylindrical and is presented outwardly away from the axis X, and two ribs 6. The inner race 1 also has two end faces 7 located at the ends of the inner raceway 5 and which are squared off with respect to the axis X. Each of the two ribs 6 have a rib face 8 and a rib diameter 9. The inner raceway 5 is located between the two ribs 6 and is generally perpendicular to the two rib faces 8. Two undercuts 9 are positioned at the intersection of the two rib faces 8 and the ends of the inner raceway 5. Typically, one end face 7 will abut a shoulder on a shaft or similar component and the other end face 7 will abut a clamping device, such as a nut, so as to position the inner race 1 firmly onto the machine component.

The rollers 3 are arranged in one or more rows around the inner race 1 and on the inner raceway 5, there being essentially line contact between the side faces of the rollers 3 and the inner raceway. The two ribs 6 act to contain the rollers 3 within the inner race 1. The rollers 3 are generally cylindrical and are sized to allow the rollers to operate smoothly while traveling on the inner raceway between the two ribs 6. The cage 4 acts to maintain the proper spacing between the rollers 3. The rollers 3 fit between the inner race 1 and the outer race 2 and roll along the inner raceway 5 and an outer raceway 10 of the outer race 2 when relative rotation occurs between the race 1 and 2.

In this embodiment, the preload mechanism is incorporated into the design of the outer race. The preload mecha-nism includes an annular groove 13, a ring segment 12, and a deformable raceway. The deformable raceway in the present embodiment is the outer raceway 10. It will be appreciated that the deformable raceway may be either the outer raceway or the inner raceway and still remain within the scope of the present invention as long as the elements of the preload mechanism are present.

In FIG. 1, the outer race 2 has a raceway 10 that is presented inwardly toward the axis X and toward the inner raceway 5 of the inner race 1. The outer race 2 has two end faces 11 at each end of the outer raceway 10. A two-piece support ring 12 is positioned within an annular groove 13 of the outer race 2. A plurality of fasteners 14 retain the support ring 12 within the annular groove 13 of the outer race 2.

Figure 2:
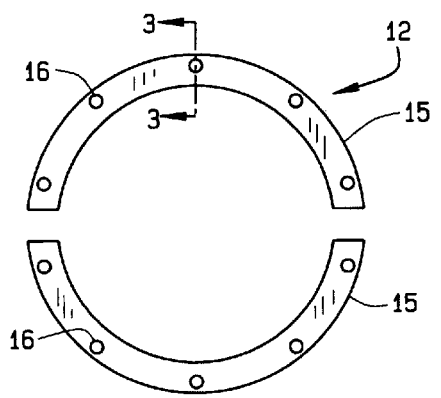
FIG. 2 is a front view of the support ring.
Figure 3:
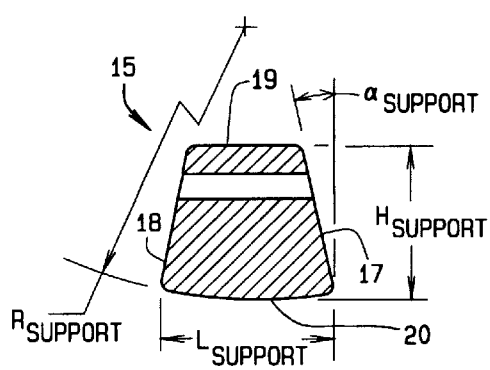
FIG. 3 is a sectional view of the support ring.

FIG. 2 shows that the support ring 12 is actually constructed of two support ring segments 15. Each segment 15 is substantially a semicircle having a series of holes 16. The sectional view of FIG. 3 shows the configuration of the cross section of each of the two segments 15. The thickness of the support ring segment 15 is indicated by the dimension $H_{Support}$ and the width of the support ring is indicated by the dimension $L_{Support}$. Each of the support ring segments 15 has a front face 17, a rear face 18, an outside face 19, and an inside face 20. The front face 17 is not perpendicular to the outside face 19, but is instead offset in relation to the inside face 20 by an angle designated as $\alpha_{Support}$. In like manner, the back face 18 is also offset in relation to the inside diameter by the same angle $\alpha_{Support}$. The inside face 20 of the support ring segment is arcuate having a radius with the dimension of $R_{Support}$. The cross sectional design of the support ring segments 15 is designed to fit into the annular groove 13 of the outer race 2, and to cooperate with the annular groove to effect a preload of the internal components of the cylindrical roller bearing A.

The value of the angle $\alpha_{Support}$ varies directly with the amount of desired operating preload which is desired within the cylindrical roller bearing A. For example, if more preload is required, the value of the angle $\alpha_{Support}$ is increased. If less preload is required, the value of the angle $\alpha_{Support}$ is decreased.

As shown in FIG. 3, the series of holes 16 in the described embodiment of the present invention are through holes passing through the entire thickness of the support segment 15.

Figure 4:
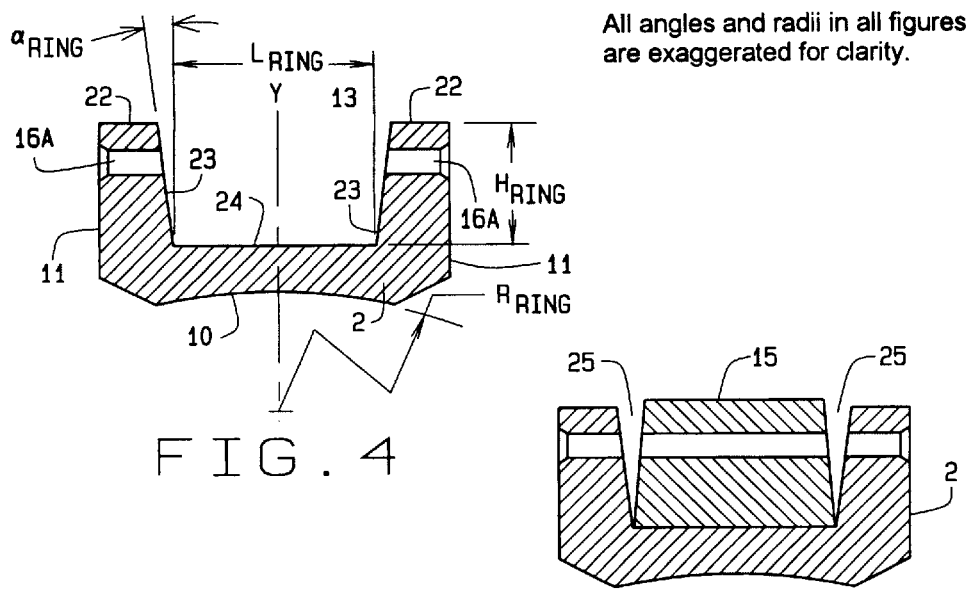
FIG. 4 is a sectional view of the outer ring.

FIG. 4 shows the annular groove 13 in the outer race 2. The annular groove 13 is in the outside diameter of the outer race 2, and has two flanges 22, two inside faces 23, and an inside diameter 24. The two inside faces 23 of the flanges 22 are slightly angled toward the two end faces 11 at an angle of $\alpha_{Ring}$. The value of the angle $\alpha_{Ring}$ is coordinated with the angle $\alpha_{Support}$ of the support ring segment 15 and is calculated based upon the amount of desired operating preload which is required within the cylindrical roller bearing A. The inside diameter 24 is initially cylindrical and coincides with the axis X of the cylindrical roller bearing A. A series of bolt holes 16A are machined and countersunk in the end faces 11 of the flanges 22. The series of bolt holes 16A are sized and located to match the series of holes 16 in the two support ring segments 15. The annular groove 13 is centered on the vertical axis Y of the outer race 2 and has a depth of $H_{Ring}$ from the outside diameter of the flanges 22 to the annular groove inside diameter 24. The outer raceway 10 is also centered on the Y axis of the outer race 2 and is arcuate, having a radius of $R_{Ring\,i}$. The radial section height $H_{Support}$ of the two support segments 15 is equal to or slightly greater than the radial height $H_{Ring}$ of the annular groove 13 of the outer race 2. This allows the flanges 22 of the outer race 2 to have movement even after mounting of the outer race 2 and support segments 15 as a subassembly in the application, while the support segments 15 are firmly contacting the two inside surfaces 23 of the annular groove 13 to support the outer race 2.

Figure 5:
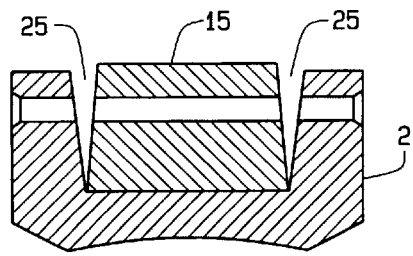
FIG. 5 is a sectional view of the cylindrical roller bearing outer ring subassembly.

In assembly of the cylindrical roller bearing A, the two support ring segments 15 are placed within the annular groove 13 of the outer race 2. It will be appreciated that the angle $\alpha_{Support}$ of the tw o support ring segments 15 and the angle $\alpha_{Ring}$ of the outer race 2 leave two gaps 25 between th e support ring segments and the outer raceway as shown in FIG. 5 When the plurality of fasteners 14 are installed through the holes 16 of the support ring segments 15 and through the holes 16A of the outer race 2, the tightening of the fasteners 14 draws the flanges 22 of the outer raceway toward the front face 17 and the rear face 18 of the two support ring segments 15. Addditionally, as the fasteners 14 are tightened, the outer raceway 10 of the outer race 2 deforms. Thus, the outer raceway 10 of the outer race 2 i s manufactured with a designed axial profile of $R_{Ring\ i}$ such that when the outer race 2 is deformed due to the tightening of the plurality of fasteners 14, the outer raceway 10 is changed from the arcuate shape into a cylindrical or slightly crowned shape, thus resulting in a preload on the internal components of the cylindrical roller bearing A. In a similar manner, the value of radius $R_{Support}$ is such that the inside face 20 of the two support ring segments 15 will match the annular groove inside diameter 24 as it will exist after the plurality of fasteners 14 have been fully tightened. This allows full support of the load bearing portion of the outer race 2 during operation of the cylindrical roller bearing A under heavy loads.

It will be appreciated, however, that other embodiments of the present invention may utilize holes in the support ring 12 which are not through holes and still remain within the scope of the dimension. In such an embodiment, the holes may be tapped blind holes to allow the use of threaded fasteners to attach the support ring 12 to the outer race 2. In other embodiments, other types of fasteners may also be used. In yet other embodiments, the outer race 2 may simply be clamped in such a manner as to compress the flanges 22 as needed to deform the outer raceway 10 from its initial arcuate shape to the final generally cylindrical shape. In fact, any type of mechanism may be used as long as the support ring 12 is secured to the outer race 2 and allows for the uniform deformation of the outer race 2 as described herein to effect a preload on the internal components of the cylindrical roller bearing A.

One possible way to assemble this particular embodiment of the cylindrical roller bearing A is to position the two support segments 15 within the annular groove 13 of the outer race 2, and loosely install the plurality of fasteners 14 into the holes 16A of the outer race 2 and holes 16 of the support segments 15. The inner race 1, including the rollers 3, is then: installed on the shaft of the machine component and then this shaft assembly is inserted into the outer race 2. After the rollers 3 have been properly positioned on the outer raceway 10 of the outer race 2, the internal components of the cylindrical roller bearing A can then be preloaded by tightening the fasteners 14 until the inside faces 23 of the outer race 2 contacts the front face 17 and the rear face 18 of the two support segments 15.

Figure 6:
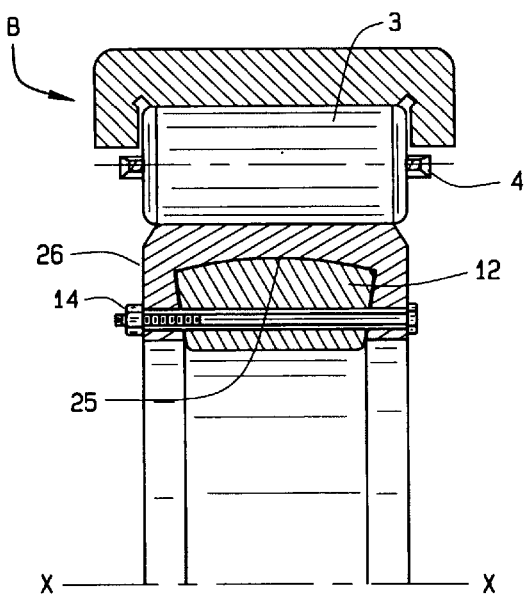
FIG. 6 is a sectional view of an second embodiment of the present invention.

FIG. 6 shows roller bearing B which is a second embodiment of the present invention wherein the preloading mechanism is incorporated into the inner race instead of the outer race. Thus, the annular groove 25 of the preloading mechanism is in the inner race 26. Except for this difference, the components of the second embodiment, as well as the dimensional relationships between the components of the second embodiment, are identical to the first embodiment described in detail above.

While the above description describes various embodiments of the present invention, it will be clear that the present invention may be otherwise easily adapted to fit any configuration where a bearing having preloaded may be utilized.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A cylindrical roller bearing having preload capability comprising:

an inner race having an inner raceway;

a plurality of cylindrical rolling elements; and an outer race having an outer raceway; and a preloading mechanism, said preloading mechanism comprising a deformable raceway and an annular groove having a support ring positioned therein, said deformable raceway having an arcuate surface which is capable of being deformed to achieve a flat to slightly crowned surface, and wherein the preload mechanism is incorporated into one of either the inner race or the outer race.

2. The cylindrical roller bearing of claim 1 wherein the support ring comprises at least two support ring segments.

3. The cylindrical roller bearing of claim 2 wherein each of the said at least two support ring segments has a series of holes.

4. The cylindrical roller bearing of claim 3 wherein said annular groove includes an inside diameter, two flanges, two end faces, and two inside faces, and wherein the two flanges have a plurality of holes sized and located to match the series of holes in each of the two support ring segments.

5. The cylindrical roller bearing of claim 4 wherein the said two inside faces of the annular groove are angled toward the two end faces at an angle of $\alpha_{Ring}$ and the arcuate surface of the deformable raceway has a radius of $R_{Ring\ i}$, and wherein the annular groove has a depth of $H_{Ring}$, and wherein the annular groove has a width of $L_{Ring}$.

6. The cylindrical roller bearing of claim 5 wherein each of the two support ring segments have a front face, a rear face, an outside face, and an inside face.

7. The cylindrical roller bearing of claim 6 wherein the front face of the support ring segments and the rear face of the support ring segments are offset in relation to the inside face by an angle of $\alpha_{Support}$, wherein the height of the support ring segments is $H_{Support}$, and wherein the inside face of the support ring segments is arcuate having a radius of $R_{Support}$.

8. The cylindrical roller bearing of claim 7 wherein the support ring segments coordinate with the deformable race such that when the at least two support ring segments are installed into the annular groove and the support ring segments are secured within the annular groove by a plurality of fasteners, the two inside surfaces of the two flanges of the outer race are biased against the front face and the rear face of each of the at least two support ring segments, and the inside diameter of the annular groove is biased against the inside face of the at least two support ring segments, thereby deforming the deformable raceway until the raceway is flat to slightly crowned.

9. The cylindrical roller bearing of claim 8 wherein the value of the angle of $\alpha_{Support}$ for the at least two support ring segments and the value of the angle of $\alpha_{Ring}$ for the annular groove are coordinated to achieve a set preload value for the cylindrical roller bearing when the at least two support ring segments have been secured within the annular groove by the plurality of fasteners.

10. The cylindrical roller bearing of claim 9 wherein the dimensional value of $H_{Support}$ is greater than the dimensional value of $H_{Ring}$.

11. The cylindrical roller bearing of claim 10 wherein the dimensional value of $L_{Ring}$ is equal to or greater than the dimensional value of $L_{Support}$.

12. A cylindrical roller bearing having preload capability comprising:
   an outer race having an outer raceway;
   an inner race having an inner raceway;
   a preload mechanism, said preload mechanism comprising a deformable raceway and an annular groove, said deformable raceway having an arcuate surface capable of being deformed into a flat to slightly crowned surface, and said annular groove having two flanges and an outside diameter and being in cooperative relationship with the deformable raceway, and wherein said preload mechanism is incorporated into one of either the inner race such that the deformable raceway is the inner raceway, or the outer race such that the deformable raceway is the outer raceway;
   a plurality of cylindrical rolling elements, said rolling elements being positioned between the inner raceway and the outer raceway and retained therein by a cage;
   a support ring, said support ring comprising at least two support ring segments, each of said support ring segments having a plurality of holes; and
   a plurality of fasteners for securing the at least two support ring segments within the annular groove of the preload mechanism.

13. The cylindrical roller bearing of claim 12 wherein each of the said at least two support ring segments has a series of holes, and wherein said annular groove includes an inside diameter, two flanges, two end faces, and two inside faces, and wherein the two flanges have a plurality of holes sized and located to match the series of holes in each of the two support ring segments.

14. The cylindrical roller bearing of claim 13 wherein the said two inside faces of the annular groove are slightly angled toward the two end faces at an angle of $\alpha_{Ring}$ and the arcuate surface of the inner raceway has a radius of $R_{Ring\ i}$, and wherein the annular groove has a depth of $H_{Ring}$, and wherein the annular groove has a width of $L_{Ring}$.

15. The cylindrical roller bearing of claim 14 wherein each of the two support ring segments have a front face, a rear face, an outside face, and an inside face, wherein the front face of the support ring segments and the rear face of the support ring segments are offset in relation to the inside face by an angle of $\alpha_{Support}$ and wherein the height of the support ring segments is $H_{Support}$, and wherein the inside face of the support ring segments is arcuate having a radius of $R_{Support}$.

16. The cylindrical roller bearing of claim 15 wherein the support ring segments coordinate with the deformable race such that when the at least two support ring segments are installed into the annular groove and the support ring segments are secured within the annular groove by the plurality of fasteners, the two inside faces of the two flanges of the annular groove are biased against the front face and the rear face of each of the at least two support ring segments, and the inside diameter of the annular groove is biased against the inside face of the at least two support ring segments, thereby deforming the deformable raceway until the deformable raceway is flat to slightly crowned.

17. The cylindrical roller bearing of claim 16 wherein the value of the angle of $\alpha_{Support}$ for the at least two support ring segments and the value of the angle of $\alpha_{Ring}$ for the annular groove are coordinated to achieve a set preload value for the cylindrical roller bearing when the at least two support ring segments have been secured within the annular groove by the plurality of fasteners.

18. The cylindrical roller bearing of claim 17 wherein the dimensional value of $H_{Support}$ is greater than the dimensional value of $H_{Ring}$ and the dimensional value of $L_{Ring}$ is equal to or greater than the dimensional value of $L_{Support}$.

19. A cylindrical roller bearing having preload capability comprising:
   an outer race having an outer raceway;
   an inner race having an inner raceway;
   a plurality of cylindrical rolling elements, said rolling elements being positioned between the inner raceway and the outer raceway;
   a cage;
   a preload mechanism, said preload mechanism comprising and a deformable raceway, an annular groove, and a support ring,
      wherein the deformable raceway having an arcuate surface with a radius of $R_{Ring\ i}$, and capable of being deformed into a flat to slightly crowned surface;
      wherein said annular groove has a depth of $H_{Ring}$, a width of $L_{Ring}$, an inside diameter, two flanges having a series of holes, two end faces, and two inside faces which are slightly angled toward the two end faces at an angle of $\alpha_{Ring}$; and
      wherein said support ring comprises at least two support ring segments, wherein each of said at least two support ring segments having a plurality of holes sized and located to match the series of holes in each of the two flanges of the annular groove, wherein each of the two support ring segments also has a front face, a rear face, an outside face, and an inside face, the front face and the rear face being offset in relation to the inside face by an angle of $\alpha_{Support}$, wherein the height of the at least two support ring segments is $H_{Support}$ wherein the inside face of the at least two support ring segments is arcuate having a radius of $R_{Support}$, wherein the value of the angle of $\alpha_{Support}$ for the at least two support ring segments and the value of the angle of $\alpha_{Ring}$ for the annular groove are coordinated to achieve a set preload value for the cylindrical roller bearing when the at least two support ring segments have been secured within the annular groove of the outer race by the plurality of fasteners, and wherein the dimensional value of $H_{Support}$ is greater than the dimensional value of $H_{Ring}$ and the dimensional value of $L_{Ring}$ is equal to or greater than the dimensional value of $L_{Support}$; and
   a plurality of fasteners for securing the at least two support ring segments within the annular groove of the outer race.

20. The cylindrical roller bearing of claim 19 wherein the at least two support ring segments coordinate with the annular groove such that when the at least two support ring segments are installed into the annular groove and the support ring segments are secured within the annular groove by the plurality of fasteners, the two inside surfaces of the two flanges of the annular groove are biased against the front face and the rear face of each of the at least two support ring segments, and the outside diameter of the annular groove is biased against the inside face of the at least two support ring segments, thereby deforming the deformable race until the deformable race is flat to slightly crowned.

* * * * *